United States Patent [19]
Hunter

[11] 3,827,549
[45] Aug. 6, 1974

[54] EXTENDED COOLING CONVEYOR
[75] Inventor: William Allan Hunter, Palatine, Ill.
[73] Assignee: Hunter Automated Machinery Corporation, Schaumburg, Ill.
[22] Filed: Mar. 16, 1973
[21] Appl. No.: 341,873

[52] U.S. Cl. .................. 198/221, 198/218, 198/224
[51] Int. Cl. ........................................... B65g 25/08
[58] Field of Search .............. 198/221, 224, 24, 218

[56] References Cited
UNITED STATES PATENTS
1,156,543  10/1915  Nevill .................................. 198/224
1,991,492  2/1935  Carpenter ........................... 198/221

Primary Examiner—James B. Marbert
Assistant Examiner—Joseph E. Valenza

[57] ABSTRACT

An extended cooling conveyor for moving poured foundry moulds in step-by-step fashion to cool the same comprises a fixed base frame supporting the moulds, and a frame movable in a closed path with respect to the base frame and including spaced mould engaging members supported thereby and alternately engaged with moulds to move same with respect to the fixed frame and disengaged therefrom to return to a position of engagement with a mould displaced from the previous mould position. Structure is provided for imparting desired movement to the movable frame, and comprises paired laterally spaced rocking members also spaced lengthwise of the fixed frame and having a pivoted connection to a fixed abutment and a slide connection between the rocking members and the movable frame.

3 Claims, 7 Drawing Figures

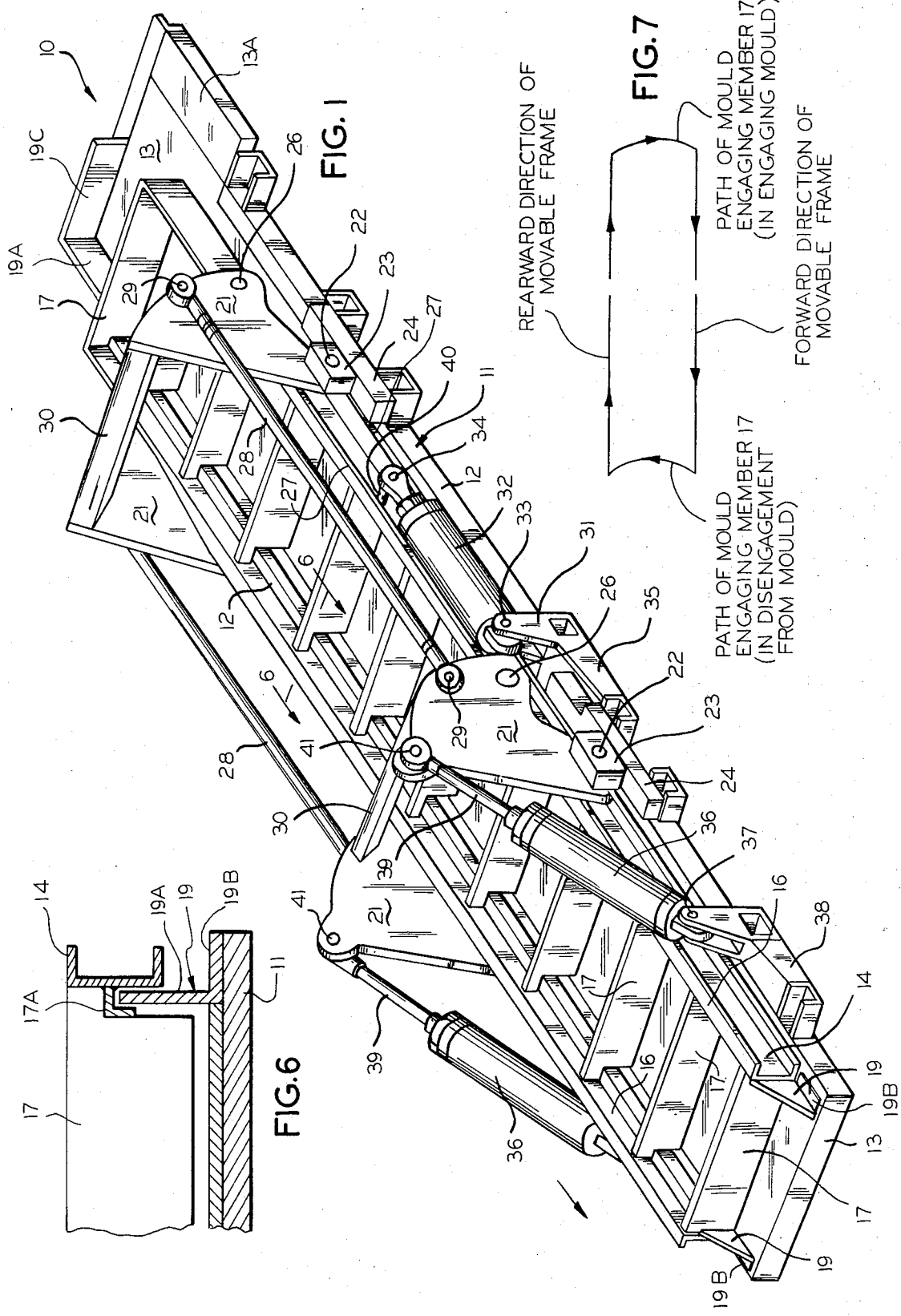

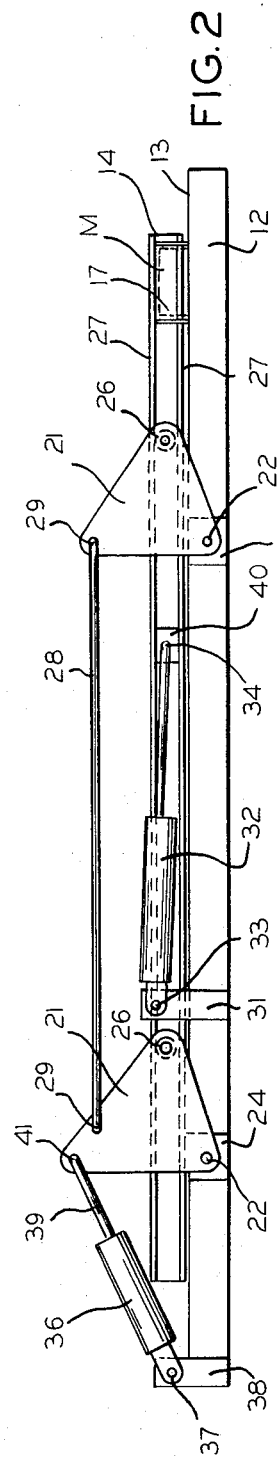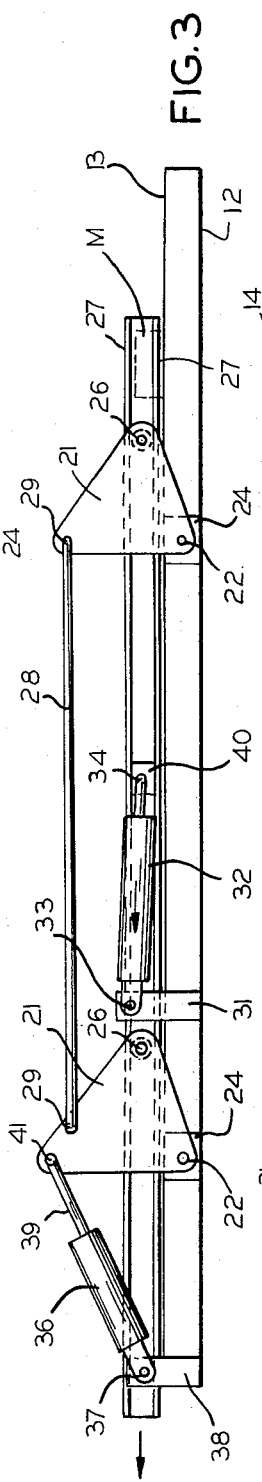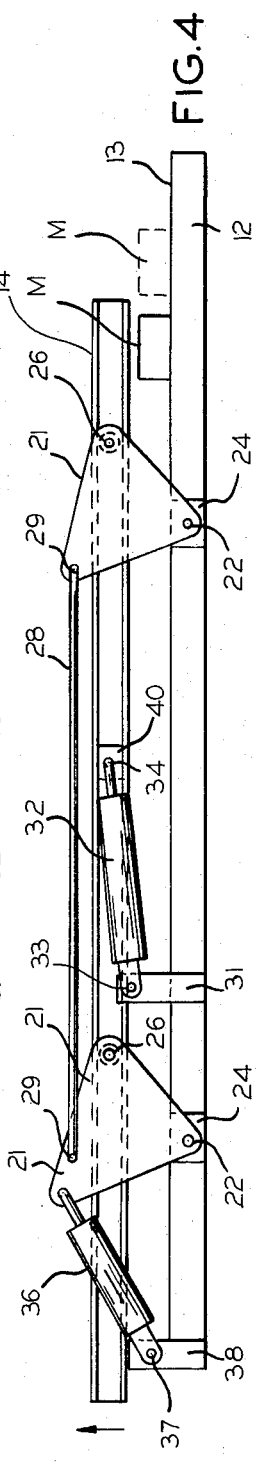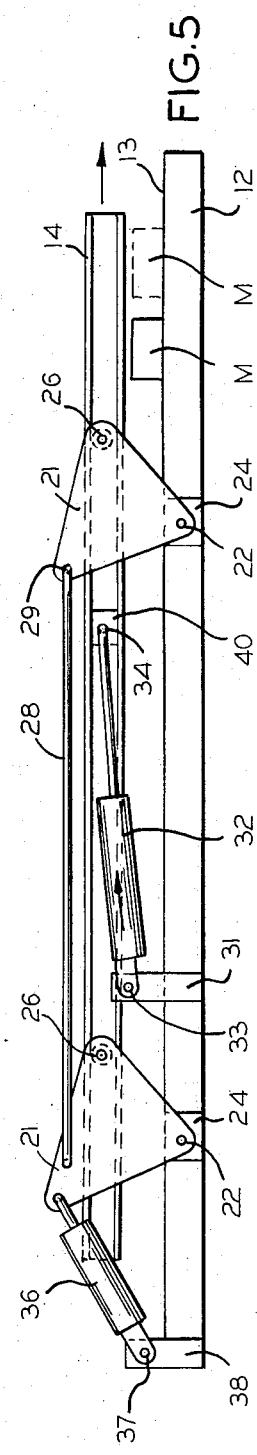

EXTENDED COOLING CONVEYOR

The arrangement is such as to give a long path of movement of the mould engaging members along the fixed frame. Moreover, the mould engaging members have a path of movement in engaging and disengaging the moulds insuring that the frangible mould material is not disturbed.

Structure is provided for linking the rocking members for conjoint movement and includes first motor means acting between a fixed abutment and the movable frame for moving the latter relative to the fixed frame and to cause the mould engaging members to move along the fixed frame. Second motor means act between a second fixed abutment and the rocking members to rock the latter to lift the movable frame and the mould engaging members out of engagement with the moulds, the first and second motor means being operable to return the movable frame to its initial position and also being able to rock the rocking members to lower said mould engaging members to position for re-engagement with the moulds.

BACKGROUND OF THE INVENTION

1. Field of the Invention

The structure according to the present invention finds application for equipment of the type as disclosed in Hunter U.S. Pat. No. 3,406,738 for MATCHPLATE MOULDING MACHING and Hunter U.S. Pat. No. 3,703,921 for MOULD HANDLING MECHANISMS. Both of the above patents show structure for forming and handling slip moulds which are poured and cooled to a degree in a mould handling machine as exemplified in the latter patent. In cases where the mass of the poured metal is rather great, extra time must be provided to enable the mould mass to be chilled properly, and the conveyor according to the present invention moves the filled moulds in step-by-step fashion to provide an extra period for chilling of the poured metal.

2. The Prior Art

The prior art developed in a search appears to be best exemplified in the following patents:

| | | | |
|---|---|---|---|
| Watson | 527,912 | Oct. 23, 1894 | |
| Crawford | 1,000,585 | Aug. 15, 1911 | |
| Shmyroff et al. | 1,880,112 | Sept. 27, 1932 | |
| Baumann | 1,927,625 | Sept. 19, 1933 | 198/224 |
| Barrett et al. | 2,823,791 | Feb. 18, 1958 | 198/224 |
| Welles | 3,230,639 | Jan. 25, 1966 | 34/233 |

SUMMARY OF THE INVENTION

The structure according to the present invention enables the filled moulds which are quite frangible to be moved carefully in step-by-step fashion to provide extra chilling of the cast metal therein. The movement of the moulds in such fashion is provided by a frame having mould engaging members thereon and moving in a closed path by means of a rocker assembly and a pair of fluid motor devices, the motor devices and the rocker assemblies providing the desired path of movement of the frame and the mould engaging means. The closed path is characterized by linear movements of the movable frame in forward and reverse directions and by usually smaller movements in vertical directions for engagement and disengagement of the moulds.

THE DRAWINGS

FIG. 1 is a perspective view showing an extended cooling conveyor according to the present invention;

FIG. 2 is a somewhat schematic side elevation view showing the structure of FIG. 1 in a position to move the moulds in a forward direction;

FIG. 3 is a view similar to FIG. 2, and showing the completion of the movement of the moulds in a forward direction;

FIG. 4 is a similar view showing the position of the parts with a movable frame shown in a lifted position ready to commence backward movement to initiate the operations seen with respect to FIGS. 2 and 3;

FIG. 5 is a similar view showing the movable frame in its rearward position ready to be lowered to the position seen in FIG. 2;

FIG. 6 is a transverse section taken along the line 6—6 of FIG. 1 looking in the direction of the arrows; and FIG. 7 is a schematic view showing the closed path of movement of the movable frame.

The improved extended cooling conveyor according to the present invention is referred to by the reference numeral 10 and includes a fixed base frame 11 having laterally spaced side frames 12 and a floor plate 13. Floor plate 13 has a side entrance 13A for moulds which are delivered thereto. A movable frame 14 movable with respect to fixed frame 11 consists of laterally spaced channel-shaped side frame members 16 having spaced mould engaging members 17 extending therebetween and adapted to engage with moulds M seen in FIGS. 2 to 5 inclusive. As seen in FIG. 6, movable frame 14 has an angle shaped member 17A welded thereto and the mould engaging members 17 are in turn welded thereto. Fixed frame 11 has side members 19 in the form of an angle with a foot 19B secured to frame 11 and a vertical leg 19C extending upward between frame member 14 and the ends of mould engaging members 17.

Structure is provided for imparting a closed path of movement to the movable frame 14, and comprises laterally spaced rocking members 21 which are also spaced lengthwise of the fixed frame 12, there being two or more pairs of such rocking members 21. Each of the rocking members 21 has a pivoted connection at a stub shaft 22 supported in a pillow block 23 made a part of a first abutment 24 flanking fixed frame 12.

A moving connection is provided between each of the rocking members 21 and the movable frame 14, and includes a gudgeon pin and roller 26 extending inward from each rock arm 21, and engaged between upper and lower flanges 27 of frame members 16 of movable frame 14.

Structure is provided for linking the rocking members 21 for conjoint movement, and includes a pair of links 28, each end of link 28 being pivotedly connected to its associated rocking member 21 at a pin connection 29. Additionally, each pair of rocking members 21 is arranged for conjoint rocking movement by means of lateral struts 30 extending between each pair of rocking members and secured at its ends thereto in any convenient fashion.

First motor means 32 are connected to act between an extension 35 from the first abutment 24, extension 35 having a bracket 31 extending upward therefrom. A pin connection 33 is provided to bracket 31 at one end of motor 32, and motor 32 has a piston rod pin connected at 34 to an abutment 40 extending from each side member 16 of the movable frame 14.

Second motor means 36 is pin connected at 37 to a second abutment 38 flanking the fixed frame 13. Second motor means 36 has a piston rod 39 which is pin connected at 41 to the rocking member 31.

The function of the first motor means 32 is to move the movable frame 14 to the left as seen in FIGS. 2 and 3, the mould engaging means 17 acting upon each mould M to move same along the base frame 13 of the fixed frame 12. At the conclusion of the movement seen in FIGS. 2 and 3, the second motor means 36 is operable to rock each of the rocking members 21 in a counterclockwise direction, such movement causing the movable frame 14 to be elevated with respect to the fixed frame 12.

At the conclusion of the movement seen in FIG. 4, the first motor means 32 is once more operable in the direction to cause the movable frame 14 to move to the right as seen by the arrows in FIG. 5. At the conclusion of such operation of the first motor means 32, the second motor means 36 becomes operable to rock rocking members 21 at clockwise direction until the parts assume the position once more as seen in FIG. 2.

The closed path of movement of movable frame 14 with respect to fixed frame 11 is best seen with respect to FIG. 7. Said figure is not to scale, but is intended to illustrate the linear forward and return path of frame 14 as compared to the normally short arcuate path of movement of frame 14 in its vertical travel. The long path of movement is achieved by fluid motor 32, while the short vertical travel is achieved by rocking member 21.

The rocking movement to raise frame 14 with respect to fixed frame 11 results in mould engaging members 17 to have an arcuate path of movement disengaging the same from mould M as it is being raised. Such arcuate path is illustrated in FIG. 7.

The return rocking movement, after fluid motor 32 is extended, results in an arcuate movement where member 17 comes into engagement with a mould M only at the bottom of its movement.

Since moulds M are exceedingly frangible, the described movement of members 17 insures against any damage thereto.

It will be seen that the moulds M are moved in step-by-step fashion along the length of the fixed frame 12 and the traverse of a mould M from the right end of the fixed frame 12 to the left end enables the casting therein to become sufficiently chilled so that the mould can be moved onto the usual shake-out device.

I claim:

1. In an extended cooling conveyor for moving relatively large articles such as poured foundry moulds in step-by-step fashion to cool the cast material in said moulds:
   a. a fixed base frame;
   b. a frame movable in a closed path with respect to said base frame;
      i. said last named frame being movable in arcuate paths toward and away from said fixed base frame, and being
      ii. movable in purely linear paths both while spaced from and in proximity to said base frame;
   c. spaced mould engaging members supported by said movable frame and alternately engaged with said moulds to move same with respect to said fixed frame and disengaged therefrom to return to a position of engagement with a mould displaced from the previously engaged mould;
   d. structure for imparting a closed path of movement to said movable frame comprising:
      i. rocking members spaced lengthwise of said fixed frame and each having a pivoted connection to a fixed abutment;
      ii. a movable connection between each of said rocking member and said movable frame;
      iii. means linking said rocking members for conjoint movement;
   e. first expansible motor means acting between a fixed abutment and said movable frame for moving the latter relative to said fixed frame and for causing said mould engaging members to move along said fixed frame;
   f. second expansible motor means acting between a second fixed abutment and said rocking members to rock the latter to lift said movable frame and said mould engaging members out of engagement with said moulds;
   g. said first expansible motor means being operable thereafter to return said movable frame to its initial position longitudinally of said fixed frame;
   h. said second expansible motor means being operable to rock said rocking members to lower said mould engaging members to position for re-engagement with said moulds.

2. In a conveyor for moving relatively large articles such as poured foundry moulds in step-by-step fashion to cool the cast material in said moulds;
   a. means defining a path of movement for said moulds;
   b. a frame movable in a closed path with respect to said means;
      i. said frame being movable in arcuate paths toward and away from said means, and being
      ii. movable in purely linear paths both while spaced from and in proximity to said means;
   c. spaced mould engaging members supported by said movable frame and alternately engaged with said moulds to move said moulds with respect to said means and disengaged from said moulds to return to a position of engagement with a mould displaced from the previously engaged mould;
   d. structure for imparting a closed path of movement to said movable frame comprised of relatively long purely linear paths and relatively short linear paths connecting said linear paths, comprising:
      i. rocking members spaced lengthwise of said mould path defining means and each having a pivoted connection to a fixed abutment;
      ii. a moving connection between each of said rocking members and said movable frame;
      iii. means linking said rocking members for conjoint movement;
      iv. first expansible motor means acting between a fixed abutment and said movable frame for moving the latter relative to said means and for causing said mould engaging members to move along said means defining said path of movement in a purely linear path;
      v. second expansible motor means acting between a second fixed abutment and said rocking members to rock said rocking members to lift said movable frame and said mould engaging members out of engagement with said moulds in a purely arcuate path;

vi. said first expansible motor means being operable thereafter to return said movable frame to initial position longitudinally of said fixed frame;

vii. said second expansible motor means being operable to rock said rocking members to lower said movable frame to position for re-engagement with said moulds.

3. In an extended cooling conveyor for moving relatively large articles such as poured foundry moulds in step-by-step fashion to cool the cast material in said moulds:

a. a frame movable in a closed path;
  i. said frame being movable in arcuate paths toward and away from said foundry moulds, and being
  ii. movable in purely linear paths both while spaced from said moulds and in proximity thereto;
b. spaced mould engaging members supported by said movable frame and alternately engaged with said moulds to move same and disengaged with a mould displaced from the previously engaged mould;
c. structure for imparting a closed path of movement to said movable frame comprising:
  i. rocking members spaced lengthwise of said movable frame and each having a pivoted connection to a fixed abutment;
  ii. a movable connection between each of said rocking members and said movable frame;
  iii. means linking said rocking members for conjoint movement;
d. first expansible motor means acting between a fixed abutment and said movable frame for moving the latter relative to said fixed frame and for causing said mould engaging members to move along a linear path of movement;
e. second expansible motor means acting between a second fixed abutment and said rocking members to rock the same to lift said movable frame and said mould engaging members out of engagement with said moulds;
f. said first expansible motor means being operable to return said movable frame to its initial position;
h. said second expansible motor means being operable to rock said rocking members to lower said mould engaging members to position for re-engagement with said moulds.

* * * * *